(12) United States Patent
Fang et al.

(10) Patent No.: US 11,904,729 B2
(45) Date of Patent: Feb. 20, 2024

(54) SUPERCONDUCTING EDDY-CURRENT BRAKE FOR HIGH- SPEED TRAIN

(71) Applicant: HEFEI INSTITUTES OF PHYSICAL SCIENCE, CHINESE ACADEMY OF SCIENCES, Anhui (CN)

(72) Inventors: Chao Fang, Anhui (CN); Jing Wei, Anhui (CN); Yuntao Song, Anhui (CN); Wenhua Dai, Anhui (CN); Jinxing Zheng, Anhui (CN)

(73) Assignee: HEFEI INSTITUTES OF PHYSICAL SCIENCE, CHINESE ACADEMY OF SCIENCES, Hefei (CN)

( * ) Notice: Subject to any disclaimer, the term of this patent is extended or adjusted under 35 U.S.C. 154(b) by 820 days.

(21) Appl. No.: 17/030,274

(22) Filed: Sep. 23, 2020

(65) Prior Publication Data

US 2021/0001729 A1  Jan. 7, 2021

Related U.S. Application Data

(63) Continuation of application No. PCT/CN2019/097327, filed on Jul. 23, 2019.

(30) Foreign Application Priority Data

Jul. 23, 2018 (CN) .......................... 201810810869.0

(51) Int. Cl.
*B60L 7/28* (2006.01)
*B60L 13/04* (2006.01)
(Continued)

(52) U.S. Cl.
CPC ................. *B60L 7/28* (2013.01); *B60L 13/04* (2013.01); *B60L 13/10* (2013.01); *H02K 49/02* (2013.01); *B60L 2200/26* (2013.01)

(58) Field of Classification Search
CPC .. B60L 7/28; B60L 13/04; B60L 13/10; B60L 2200/26; H02K 49/02
See application file for complete search history.

(56) References Cited

U.S. PATENT DOCUMENTS 3,615,881 A * 10/1971 Greene .................. C23C 14/14
                                                            250/424
3,723,795 A    3/1973 Baermann
(Continued)

FOREIGN PATENT DOCUMENTS

CN    101468609 A    7/2009
CN    106183836 A    12/2016
(Continued)

*Primary Examiner* — Scott A Browne

(57) ABSTRACT

A superconducting eddy-current brake for high-speed trains includes a pair of superconducting magnet units with alternate arrangement of N and S poles; and a cryogenic system. The superconducting magnet units are fixed on a bottom of a bogie of the train and an air gap is provided between the superconducting magnet units and a top surface of a rail below the bogie. The cryogenic system is provided on the bogie of the train. Each superconducting magnet unit is embedded with a superconducting container including a coil case, a thermal shield and a Dewar successively from inside to outside. The coil case is filled with liquid helium. A superconducting coil is provided in the coil case and immersed in the liquid helium. A high-vacuum environment is provided in the thermal shield. Liquid nitrogen inlet and outlet pipes are provided on an outer wall of the thermal shield.

11 Claims, 3 Drawing Sheets

(51) Int. Cl.
  *B60L 13/10*     (2006.01)
  *H02K 49/02*     (2006.01)

(56) References Cited

U.S. PATENT DOCUMENTS

| | | | | | |
|---|---|---|---|---|---|
| 3,801,942 | A * | 4/1974 | Elsel | ............... | H01F 6/06 |
| | | | | | 505/879 |
| 5,739,689 | A * | 4/1998 | Roth | ............... | F17C 3/085 |
| | | | | | 324/319 |
| 6,062,350 | A * | 5/2000 | Spieldiener | ............ | A63G 31/00 |
| | | | | | 188/164 |
| 6,533,083 | B1 * | 3/2003 | Pribonic | ............... | B60L 7/28 |
| | | | | | 188/165 |
| 11,485,392 | B2 * | 11/2022 | Kadokawa | ............ | H02K 49/04 |
| 2021/0005367 | A1 * | 1/2021 | Song | ............... | B61H 11/00 |

FOREIGN PATENT DOCUMENTS

| | | |
|---|---|---|
| CN | 107539335 A | 1/2018 |
| CN | 109102985 A | 12/2018 |
| CN | 109109670 A | 1/2019 |

* cited by examiner

SUPERCONDUCTING EDDY-CURRENT BRAKE FOR HIGH- SPEED TRAIN

CROSS-REFERENCE TO RELATED APPLICATIONS

This application is a continuation of International Application No. PCT/CN2019/097327, filed on Jul. 23, 2019, which claims the benefit of priority from Chinese Patent Application No. 201810810869.0, filed on Jul. 23, 2018. The content of the aforementioned applications, including any intervening amendments thereto, is incorporated herein by reference.

TECHNICAL FIELD

This application relates to locomotive braking, and more particularly to a braking technique for a high-speed train.

BACKGROUND OF THE INVENTION

Currently, the braking methods for high-speed trains mainly include brake lining braking, disc braking and electric braking, which are all performed by adhesion, so the braking effect will be greatly influenced by the adhesion performance between wheel and rail, i.e. friction coefficient between the wheel and rail. Moreover, the parts used in such braking manners, such as brake disc and brake lining, are prone to serious wear and tear due to the large mechanical friction. For a train and its running line, the friction coefficient between the wheel and rail is mainly affected by the following factors: 1) rail surface condition: the friction coefficient between the wheel and rail will be greatly reduced under harsh natural conditions such as rain, snow, frost and fallen leaves; and 2) operation speed: the wheel-rail friction coefficient will be reduced rapidly as the train speed increases, and it has been demonstrated by the practical operation experience that the wheel-rail friction coefficient will drop dramatically and thus will be prone to serious slipping when the train speed is more than 300 km/h. Moreover, on a long descending line, when the braking is performed merely in the adhesion manner, the train will suffer from great decrease in the service life of parts.

Eddy-current braking, which gets rid of the dependence on the adhesion between the wheel and rail, can greatly improve the braking capability when used in combination with the existing wheel-rail adhesion braking. Currently, the main eddy-current braking for a high-speed train is permanent magnet eddy-current braking and electromagnetic eddy-current braking according to the excitation mode. The permanent magnet eddy-current braking does not need external power supply and generally has small weight, low thermal load and operation cost, but it involves nonadjustable braking force and still has magnetism in a non-operating state. The electromagnetic eddy-current braking generally uses a conventional magnet, i.e. an iron core winding, and has advantages of larger braking force, in which the braking force can be adjusted by changing the exciting current. Therefore, the electromagnetic eddy-current braking is the development trend of the eddy-current braking techniques for the high-speed train. However, the electromagnetic eddy-current braking is limited in the braking force by the weight and volume, and has large electric power consumption and high coil temperature. In addition, the braking force will decrease seriously within the high-speed range (>300 km/h). From the perspective of lightening the weight of the high-speed train, saving energy and maintaining sufficient braking force within the high-speed range, it is of great significance to provide a new eddy-current brake for high-speed trains for the future development of the eddy-current braking technology.

SUMMARY OF THE INVENTION

An object of this application is to provide a superconducting eddy-current brake for a high-speed train to overcome the defects in the prior art, where the superconducting eddy-current brake can not only provide desirable braking force during the high-speed running, but also facilitate the light weighting and the energy saving of high-speed trains.

The technical solutions of this application are described as follows.

The invention provides a superconducting eddy-current brake for a high-speed train, comprising a pair of superconducting magnet units with alternate arrangement of N and S poles, and a cryogenic system;
wherein the superconducting magnet units are fixed on a bottom of a bogie of the high-speed train; and an air gap is formed between the superconducting magnet units and a top surface of a guide rail below the bogie;
the cryogenic system is provided on the bogie of the high-speed train;
each of the superconducting magnet units comprises a superconducting container; wherein the superconducting container is embedded with a coil case, a thermal shield and a Dewar from inside to outside;
the coil case is filled with liquid helium; a liquid helium inlet and a liquid helium outlet are provided on the coil case; a superconducting coil is provided in the coil case and is immersed in the liquid helium; a coil terminal inlet and a coil terminal outlet are provided on the coil case;
the thermal shield has a vacuum environment therein; a liquid nitrogen inlet pipe and a liquid nitrogen outlet pipe are provided on an outer wall of the thermal shield; a liquid nitrogen inlet and a liquid nitrogen outlet respectively corresponding to the liquid nitrogen inlet pipe and the liquid nitrogen outlet pipe are provided on the thermal shield;
the cryogenic system comprises a liquid nitrogen storage tank and a liquid helium storage tank; an outlet of the liquid helium storage tank is connected with the liquid helium inlet of the superconducting container of each of the superconducting magnet units; an outlet of the liquid nitrogen storage tank is connected with the liquid nitrogen inlet of the superconducting container for each of the superconducting magnet units.

In some embodiments, an inner pipe integrated with the thermal shield and an outer pipe integrated with the Dewar are provided at both sides of the superconducting container, respectively; the outer pipe is correspondingly sheathed outside the inner pipe; the both sides of the superconducting container are respectively provided with a lateral tie rod; the lateral tie rod comprises a first inner insulation block, a lateral spring, a first outer insulation block and a lateral force transmission rod; each of two side walls of the coil case is fixedly provided with the first inner insulation block; the lateral force transmission rod is fixedly sheathed in the corresponding inner pipe; an outer end of the lateral force transmission rod extends out of the corresponding inner pipe and is fixed at an end of the corresponding outer pipe; an inner end of the lateral force transmission rod is fixedly connected to the corresponding first outer insulation block; and the lateral spring is provided between the first inner insulation block and the first outer insulation block.

In some embodiments, a vertical tie rod is provided on an upper part of the superconducting container; the vertical tie rod comprises a second inner insulation block, a vertical spring, a second outer insulation block and a vertical force transmission rod; a groove is provided on a top of the coil case; the second inner insulation block is fixed at a bottom of the groove; the vertical force transmission rod is longitudinally and fixedly sheathed at a top of the thermal shield; a top end of the vertical force transmission rod passes through the thermal shield and is fixed on the Dewar; a bottom end of the vertical force transmission rod is fixedly connected to the second outer insulation block; and the vertical spring is provided between the second inner insulation block and the second outer insulation block.

In some embodiments, the superconducting coil is fixed in the coil case through a limit block.

In some embodiments, a liquid-level gauge and a temperature sensor are provided in the coil case.

In some embodiments, the air gap between the superconducting magnet units and the top surface of the guide rail is 5-30 mm.

In some embodiments, a liquid level of the liquid helium exceeds a height of the corresponding superconducting coil by at least more than half the height of the corresponding superconducting coil.

In some embodiments, the superconducting coil is oval-shaped.

In some embodiments, four vertical tie rods are evenly distributed on an upper part of the superconducting container.

The superconducting eddy-current brake for high-speed trains mainly includes the superconducting magnet units and the cryogenic system, where the excitation of the superconducting magnet is performed using the power supply during the braking operation. The air gap is provided between a bottom surface of each of the superconducting magnet units and a top surface of a high-speed train rail. After the excitation, an electromagnetic braking is generated between the superconducting magnet units and the high-speed train rail to achieve the braking for the high-speed train. The superconducting magnet units are kept in the low temperature required for the superconducting operation during a non-operating state. The cryogenic system is configured to compensate the refrigerant loss caused by the superconducting magnet units during the braking and daily heat leakage. The superconducting magnet units and the cryogenic system are fixed on the train via a connecting unit. Given the above, the present invention is applicable to the train braking under a high-speed condition.

In some embodiments, the superconducting magnet units adjust the eddy braking force by changing the exciting current.

In some embodiments, at a non-braking state, a required low temperature for superconducting working of the superconducting magnet units is ensured by the refrigerant stored in the magnet and the cryogenic system.

In some embodiments, the cryogenic system comprises a compressor, a refrigerating head and a refrigerant storage tank. The refrigerant storage tank is configured to compensate the refrigerant loss caused by the superconducting magnet units during the braking and daily heat leakage.

In some embodiments, the refrigerating head of the cryogenic system is configured to recycle the vaporized refrigerant caused by the superconducting magnet units during the braking and daily heat leakage in time, liquify the vaporized refrigerant again and store the refrigerant to the refrigerant storage tank, achieving the recycling of the refrigerant.

The invention has the following beneficial effect.

Compared with the existing adhesion braking, the superconducting eddy-current brake for a high-speed train is one kind of non-adhesion braking, so the braking effect is free of influences of the adhesion between the wheel and trail.

Compared with the permanent magnet eddy-current braking, the invention has an adjustable braking force, and is capable of providing a lager braking force. Moreover, the brake provided herein is nonmagnetic at a non-operating state.

Compared with the normal electromagnetic eddy-current braking, the invention reduces the energy consumption during the operation, and greatly increases the braking force under the same volume and weight. The invention can also provide enough braking force even during the high-speed travelling (>300 km/h).

DETAILED DESCRIPTION OF EMBODIMENTS

This application will be further described below with reference to the embodiments and accompanying drawings.

Embodiment 1

Figure 1:
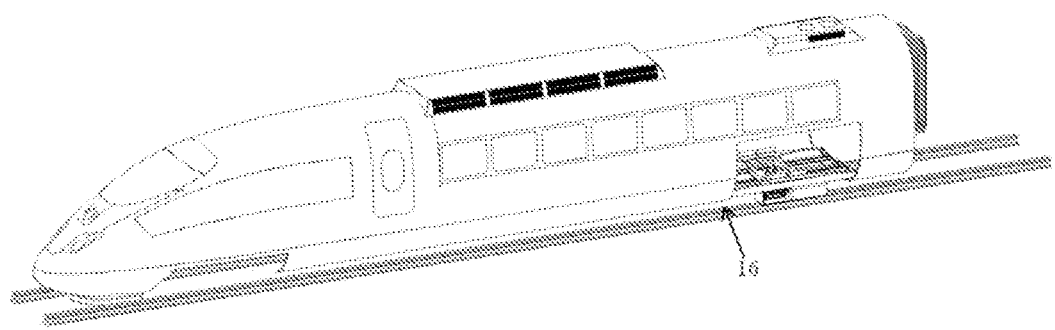
FIG. 1 is a schematic diagram of a superconducting eddy-current brake for a high-speed train according to the present invention.
Figure 2:
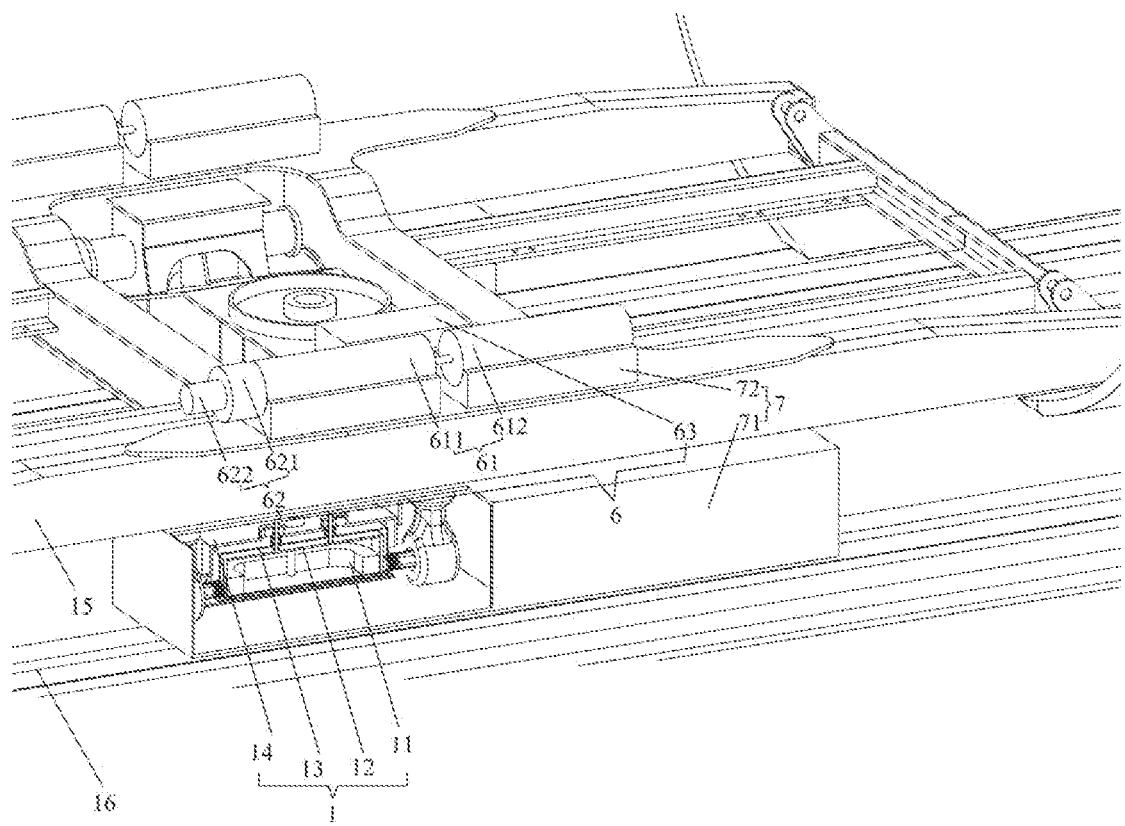
FIG. 2 is a partial diagram of the superconducting eddy-current brake according to the present invention.
Figure 3:
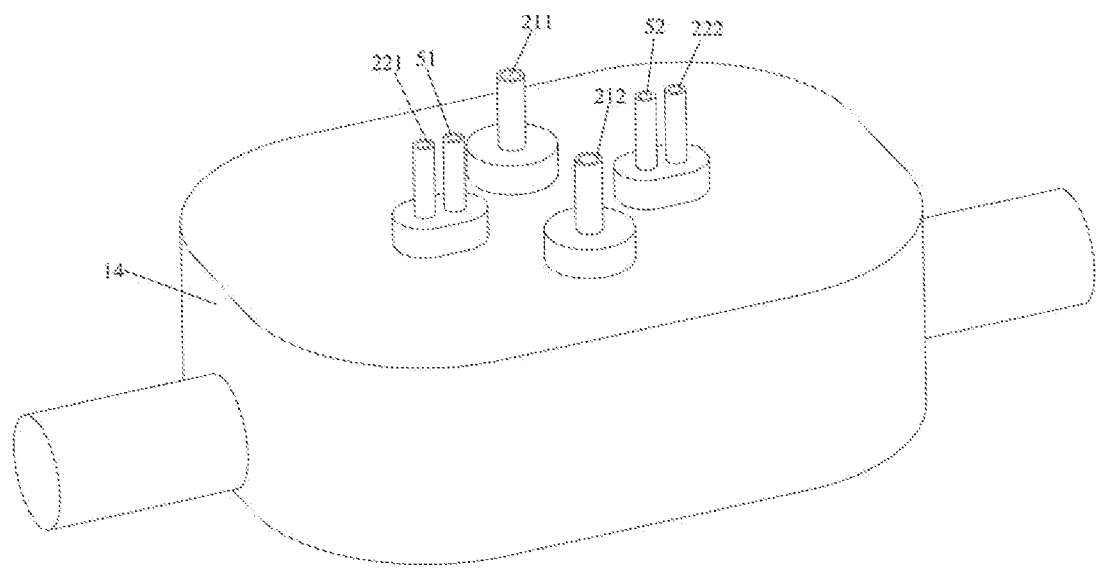
FIG. 3 schematically shows an outer structure of a superconducting magnet unit of the superconducting eddy current brake according to the present invention.
Figure 4:
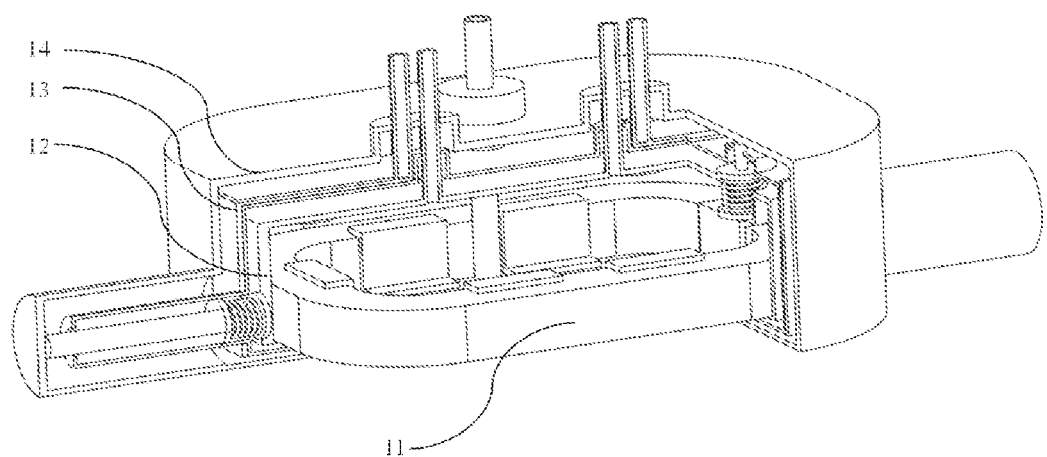
FIG. 4 schematically shows an inner structure of the superconducting magnet unit according to the present invention.
Figure 5:
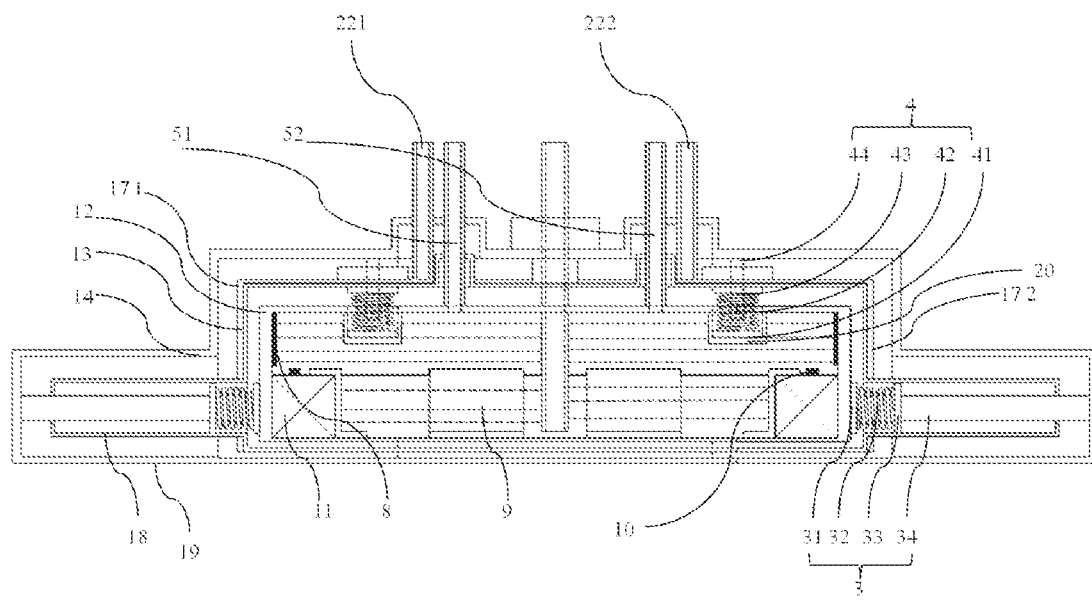
FIG. 5 is a longitudinal section view of the superconducting magnet unit of the superconducting magnet unit according to the present invention.

As shown in the FIGS. 1-5, the invention provides a superconducting eddy-current brake for a high-speed train, including two superconducting magnet units 1, a cryogenic system 6 and a connecting unit 7. The superconducting magnet units 1 are fixed on a bottom of a bogie 15 through the connecting unit 7. The superconducting magnet units 1 are located right above two guide rails 16 of the high-speed train and an air gap is formed. An electrical eddy-current effect is generated between the superconducting magnet units 1 and the guide rails 16 there below to provide a braking force opposite to the driving direction of the high-speed train.

Specifically, each of the two superconducting magnet units 1 includes a superconducting coil 11 to form alternating N and S poles.

Specifically, the superconducting magnet units 1 are excited using a power source during the daily braking or emergency braking. After the braking is finished, the superconducting magnet units 1 are demagnetizing slowly. There is no current load during the normal operation of the train.

Specifically, the superconducting magnet units 1 are immersion-type superconducting magnets. Each of the immersion-type superconducting magnets is embedded with the superconducting coil 11, a coil case 12, a thermal shield 13 and a Dewar 14 successively from inside to outside. The coil case 12 is filled with liquid helium, and the superconducting coil 11 is directly immersed in the liquid helium. Through the operation of the cryogenic system 6, the superconducting coil 11 is allowed to be kept at the liquid helium temperature no matter the train is braked or not.

Specifically, the superconducting coil 11 is prepared by winding an NbTi superconducting wire and insulated by vacuum pressure impregnation. The coil case 12 is made of a non-magnetic material such as stainless steel and aluminum. The thermal shield 13 is made of copper. The Dewar 14 is also made of a non-magnetic material such as stainless steel and aluminum.

Specifically, the thermal shield 13 has a vacuum environment therein, and a liquid nitrogen inlet pipe 171 and a liquid nitrogen outlet pipe 172 are provided on an outer wall of the thermal shield 13; and the Dewar 14 has a high-vacuum multilayer insulating structure, which generates a thermal insulation between the external environment and the superconducting magnet units 1.

Specifically, the cryogenic system 6 includes a refrigerant storage tank 61, a refrigerating head 62 and a compressor 63. The refrigerant storage tank 61 is configured to compensate the refrigerant loss caused by the alternating current (AC) loss of the superconducting magnet units 1 during the braking and daily heat leakage. The refrigerating head 62 is configured to recycle the vaporized refrigerant in time caused by the braking of the superconducting magnet units 1 and daily heat leakage, liquify the vaporized refrigerant again and store the refrigerant to the refrigerant storage tank 61, achieving the recycling of the refrigerant.

The refrigerant storage tank 61 of the cryogenic system 6 includes a liquid helium storage tank 611 and a liquid nitrogen storage tank 612. The liquid helium storage tank 611 is used to compensate the liquid helium loss caused by the AC loss of the superconducting magnet units 1 during the braking and daily heat leakage. The liquid nitrogen storage tank 612 is used to compensate the liquid nitrogen loss caused by the AC loss of the superconducting magnet units 1 during the braking and daily heat leakage.

The refrigerating head 62 includes a first refrigerating head 621 configured to liquify helium gas generated from the liquid helium loss caused by the AC loss of the superconducting magnet units 1 during the braking and daily heat leakage; and a second refrigerating head 622 configured to liquify nitrogen generated from the liquid nitrogen loss caused by the AC loss of the superconducting magnet units 1 during the braking and daily heat leakage.

Specifically, the connecting unit 7 includes a magnet connecting unit 71 and a low-temperature refrigerating connecting unit 72.

The magnet connecting unit 71 is configured to connect the superconducting magnet units 1 and the bogie 15, and constrain the position of the superconducting magnet units 1. The low-temperature refrigerating connecting unit 72 is configured to connect the cryogenic system 6, including the refrigerant storage tank 61, the refrigerating head 62 and the compressor 63, to the bogie 15 or a train carriage, and constrain the position of the cryogenic system 6.

Each of the superconducting magnet units 1 further includes, a lateral tie rod 3, a vertical tie rod 4, a coil terminal inlet 51 and a coil terminal outlet 52, a liquid-level gauge 8, a limit block 9 and a temperature sensor 10. The limit block 9 is configured to constrain the super conducting coil 11 to the coil case 12 to avoid an influence of a vibration generated during the operation of the high-speed train on the magnetic field homogeneity and an impact to the superconducting coil 11 caused by the inertia effect during the acceleration and deceleration processes.

Specifically, the coil case 12 is provided with a liquid helium inlet 211 and a liquid helium outlet 212 which are configured to connect to a liquid helium supplement part of an external refrigerating system. The thermal shield 13 is provided with a liquid nitrogen inlet 221 and a liquid nitrogen outlet 222 respectively corresponding to the liquid nitrogen inlet pipe 171 and the liquid nitrogen outlet pipe 172, and the liquid nitrogen inlet 221 and the liquid nitrogen outlet 222 are configured to connect to a liquid nitrogen supplement part of an external refrigerating system.

Through the lateral tie rod 3 and the vertical tie rod 4, the superconducting magnet units 1 can adapt to the impact brought by the train vibration when the train runs. Specifically, the lateral tie rod 3 is configured to ease the impact force to the superconducting magnets brought by the inertia along a lateral direction, i.e., the driving direction of the train, during the braking and running. The vertical tie rod 4 is configured to ease the impact force to the superconducting magnets brought by the inertia along a vertical direction during the braking and running.

The lateral tie rod 3 includes a first inner insulation block 31, a lateral spring 32, a first outer insulation block 33 and a lateral force transmission rod 34. The first inner insulation block 31 is fixed on a side wall of the coil case 12. The lateral force transmission rod 34 is fixedly sheathed in a corresponding inner pipe 18. An outer end of the lateral force transmission rod 34 extends out of the corresponding inner pipe 18 and is fixed at an end of a corresponding outer pipe 19. An inner end of the lateral force transmission rod 34 is fixedly connected to the first outer insulation block 33. The lateral spring 32 is provided between the first inner insulation block 31 and the first outer insulation block 33. The vertical tie rod 4 includes a second inner insulation block 41, a vertical spring 42, a second outer insulation block 43 and a vertical force transmission rod 44. A groove 20 is provided on a top of the coil case 12. The second inner insulation block 43 is fixed at a bottom of the groove 20. The tie rods are made of metal, glass fiber or carbon fiber composite. The lateral spring 32 is configured to reduce the impact to a superconducting magnet container including the coil case 12, the thermal shield 13 and the Dewar 14 during the train braking and running. The insulation blocks are configured to reduce the heat leakage to the coil case 12 brought by the tie rods.

The coil case 12 and the thermal shield 13 are fixed on the Dewar 14 through the lateral tie rod 3 and the vertical tie rod 4. The thermal shield 13 and the Dewar 14 are fixedly connected to the lateral force transmission rod 34 and the vertical force transmission rod 44 in a welding or mechanical manner. The coil case 12 is fixedly connected to the first inner insulation block 31 and the second inner insulation block 41 in a mechanical or glued manner.

Specifically, the superconducting coil 11 is fixed in the coil case 12 through the limit block 9.

Specifically, through an excitation source, a desired magnetic field strength can be obtained within 1 s after the superconducting magnets are electrified, significantly shortening the excitation process.

Specifically, the liquid-level gauge 8 and the temperature sensor 10 are provided inside the superconducting magnet, i.e., in the coil case 12, for monitoring the running temperature of the superconducting magnets to prevent the quench caused by a too high working temperature of the magnets or a too low liquid level of the refrigerant during the working process.

Embodiment 2

The difference between this embodiment and Embodiment 1 is only that the superconducting coil used herein is made of a high-temperature superconducting wire, bulk or tape.

The above-mentioned embodiments are merely illustrative of the invention, and are not intended to limit the invention. Variations and modifications made by those skilled in the art without paying any creative effort should fall within the scope of the invention.

What is claimed is:

1. A superconducting eddy-current brake for a high-speed train, comprising a pair of superconducting magnet units with alternate arrangement of N and S poles, and a cryogenic system;
wherein the superconducting magnet units are fixed on a bottom of a bogie of the high-speed train; and an air gap is formed between the superconducting magnet units and a top surface of a guide rail below the bogie;
the cryogenic system is provided on the bogie of the high-speed train;
each of the superconducting magnet units comprises a superconducting container; wherein the superconducting container is embedded with a coil case, a thermal shield and a Dewar successively from inside to outside;
the coil case is filled with liquid helium; a liquid helium inlet and a liquid helium outlet are provided on the coil case; a superconducting coil is provided in the coil case and is immersed in the liquid helium; a coil terminal inlet and a coil terminal outlet are provided on the coil case;
the thermal shield has a vacuum environment therein; a liquid nitrogen inlet pipe and a liquid nitrogen outlet pipe are provided on an outer wall of the thermal shield; a liquid nitrogen inlet and a liquid nitrogen outlet respectively corresponding to the liquid nitrogen inlet pipe and the liquid nitrogen outlet pipe are provided on the thermal shield;
the cryogenic system comprises a liquid nitrogen storage tank and a liquid helium storage tank; an outlet of the liquid helium storage tank is connected with the liquid helium inlet of the superconducting container of each of the superconducting magnet units; and an outlet of the liquid nitrogen storage tank is connected with the liquid nitrogen inlet of the superconducting container for each of the superconducting magnet units.

2. The superconducting eddy-current brake of claim 1, wherein an inner pipe integrated with the thermal shield and an outer pipe integrated with the Dewar are provided at both sides of the superconducting container, respectively; the outer pipe is correspondingly sheathed outside the inner pipe; the both sides of the superconducting container are respectively provided with a lateral tie rod; the lateral tie rod comprises a first inner insulation block, a lateral spring, a first outer insulation block and a lateral force transmission rod; each of two side walls of the coil case is fixedly provided with the first inner insulation block; the lateral force transmission rod is fixedly provided in the corresponding inner pipe; an outer end of the lateral force transmission rod extends out of the corresponding inner pipe and is fixed at an end of the corresponding outer pipe; an inner end of the lateral force transmission rod is fixedly connected to the corresponding first outer insulation block; and the lateral spring is provided between the first inner insulation block and the first outer insulation block.

3. The superconducting eddy-current brake of claim 1, wherein a vertical tie rod is provided on an upper part of the superconducting container; the vertical tie rod comprises a second inner insulation block, a vertical spring, a second outer insulation block and a vertical force transmission rod; a groove is provided on a top of the coil case; the second inner insulation block is fixed at a bottom of the groove; the vertical force transmission rod is longitudinally and fixedly sheathed at a top of the thermal shield; a top end of the vertical force transmission rod passes through the thermal shield and is fixed on the Dewar; a bottom end of the vertical force transmission rod is fixedly connected to the second outer insulation block; and the vertical spring is provided between the second inner insulation block and the second outer insulation block.

4. The superconducting eddy-current brake of claim 2, wherein a vertical tie rod is provided on an upper part of the superconducting container; the vertical tie rod comprises a second inner insulation block, a vertical spring, a second outer insulation block and a vertical force transmission rod; a groove is provided on a top of the coil case; the second inner insulation block is fixed at a bottom of the groove; the vertical force transmission rod is longitudinally and fixedly sheathed at a top of the thermal shield; a top end of the vertical force transmission rod passes through the thermal shield and is fixed on the Dewar; a bottom end of the vertical force transmission rod is fixedly connected to the second outer insulation block; and the vertical spring is provided between the second inner insulation block and the second outer insulation block.

5. The superconducting eddy-current brake of claim 1, wherein the superconducting coil is fixed in the coil case through a limit block.

6. The superconducting eddy-current brake of claim 1, wherein a liquid-level gauge and a temperature sensor are provided in the coil case.

7. The superconducting eddy-current brake of claim 1, wherein the air gap between the superconducting magnet units and the top surface of the guide rail is 5-30 mm.

8. The superconducting eddy-current brake of claim 1, wherein a liquid level of the liquid helium exceeds a height of the corresponding superconducting coil by at least more than 0.5 times the height of the corresponding superconducting coil.

9. The superconducting eddy-current brake of claim 1, wherein the superconducting coil is oval-shaped.

10. The superconducting eddy-current brake of claim 3, wherein four vertical tie rods are evenly distributed on an upper part of the superconducting container.

11. The superconducting eddy current brake of claim 4, wherein four vertical tie rods are evenly distributed on an upper part of the superconducting container.

* * * * *